ELECTRONIC DISCHARGE DEVICE

Filed April 26, 1946 5 Sheets-Sheet 1

INVENTOR.
Jan A. Rajchman
BY C. D. Tuska
ATTORNEY

INVENTOR.
Jan A. Rajchman
BY
C. D. Tuska
ATTORNEY

Jan. 17, 1950 J. A. RAJCHMAN 2,494,670

ELECTRONIC DISCHARGE DEVICE

Filed April 26, 1946 5 Sheets-Sheet 3

INVENTOR
Jan A. Rajchman
BY
C. D. Tuska
ATTORNEY

INVENTOR.
Jan A. Rajchman
BY C. D. Tuska
ATTORNEY

Jan. 17, 1950 J. A. RAJCHMAN 2,494,670

ELECTRONIC DISCHARGE DEVICE

Filed April 26, 1946 5 Sheets-Sheet 5

INVENTOR.
Jan A. Rajchman
BY C D Tuska
ATTORNEY

Patented Jan. 17, 1950 2,494,670

UNITED STATES PATENT OFFICE 2,494,670

ELECTRONIC DISCHARGE DEVICE

Jan A. Rajchman, Princeton, N. J., assignor to Radio Corporation of America, a corporation of Delaware Application April 26, 1946, Serial No. 665,031

24 Claims. (Cl. 250—27.5)

This invention relates to electronic switching and storage devices, and in particular to a method of and means for storing a large number of electrical signals which may be collected and utilized subsequently in any desired sequence and at extremely high speeds.

I. *Introduction*

There are many uses to which an electronic storage device, or "memory" can be put. One of the principal uses is in connection with calculating machines which transform certain given electrical quantities into new quantities in accordance with certain preestablished relationships. Methods are known for performing most computations electronically. These include addition, subtraction, multiplication, differentiation, integration and the generation of trigonometric as well as arbitrary functions of one and two variables.

Mechanical or electro-mechanical computation is made necessary in many fields of research as well as in military and industrial operations because of the tremendous number of computations required in the solution of certain problems, particularly where the time element does not permit laborious manual solution. Computations of the type considered involve several, or perhaps all of the above processes, and a complete solution thus requires a series of separate computations which are combined in a predetermined manner to produce the ultimate result. The process of integration itself may require a tremendous number of operations, since electronic integration involves breaking the problem down into the addition of a large number of incremental steps.

Present methods of computation provide a "memory" to retain partial results until needed by utilizing, for example, pairs of vacuum tubes connected so that when one is conducting the other is non-conducting, and which are commonly known as "flip-flops." (See page 68 of "Electrical Counting" by W. B. Lewis, published by the Cambridge University Press in 1942.) Recording is accomplished by determining the "off" or "on" condition of the necessary number of flip flops in accordance with a code. This code may, for example, be based on the binary system of computation in which all numbers are represented by combinations of only two digits, "zero" and "one" and which is therefore ideally suited to representation by the "off" or "on" condition of the tubes. A serious practical disadvantage of this system of recording is that an extremely large number of such "flip-flops" are required. It is, therefore, a further object of this invention to provide, in a single tube, storage capacity equivalent to many thousands, even millions, of such storage devices. A further and related object of this invention is to provide such a storage tube in which the information may be held indefinitely.

An essential requirement of a storage tube capable of accurately "remembering" information is its ability to receive information in a given memory or pigeon-hole, retain it until needed, and then to give back the information when called for. The withdrawal should not clear the information from the memory element, so that the information may be withdrawn once or many times. A copending application of R. L. Snyder, Serial No. 606,812, filed July 24, 1945, for Electron tubes, describes and claims a cathode ray type tube which records electrical signals by establishing electrical charges which are distributed over a dielectric surface, and which later reproduces the record by removing the charges in the same order. An electron beam moving at a constant speed across a specially treated dielectric surface is used to generate the charges. While such a device has many useful applications, it is limited as to resolving power, that is, it cannot accommodate as large a number of discrete elements of information as is necessary in many applications. Further, due to the difficulty of accurately controlling the instantaneous position of the beam, it is difficult to return the beam to its exact earlier position. This difficulty increases in direct proportion to the number of memory elements. Since the beam scans an area, with such a tube one cannot select at random information from any desired memory element, but must pass in turn from one to the other in a predetermined order. It is therefore a related object of this invention to provide means for directing electrons at any preselected point on a target instantly and accurately, without passing over any adjacent points on the target, and in particular, to apply this principle to a storage tube whereby any one of many thousands of memory elements may be selected, the information stored and retained, and later the identical memory element may be called upon to give up its information without passing over any adjacent memories, and this notwithstanding the fact that the number of discrete memory elements is far greater than has been practical heretofore. Because of its ability to select instantly a single memory element without sweeping through any others, the tube made in accordance with this invention is called a "Selectron."

Although the Selectron is unique in its ability to select discrete positions on the target by the application of suitable control voltages, the target may also be scanned in line sequence, or indeed, in any desired sequence and at any desired speed. The Selectron is useful, therefore, in the reproduction of television pictures, or the like, and may readily accomplish interlaced scanning of alternate lines, or any other desired pattern. In such an application the memory screen would be replaced by a conventional luminescent screen. The tube may also have luminescence in addition to memory, thus giving a visual indication of the actual position of the beam. It is, accordingly, a still further object of this invention to provide a cathode ray tube in which electrons may be directed at a target area so as to strike discrete areas thereof in any desired sequence, and, in fact, to strike the entire surface or different portions thereof simultaneously. A further object is to provide such a tube with either a fluorescent screen, or a plurality of memory elements in which information is to be stored, or both.

While there are many additional uses to which the "Selectron" can be put, the above are sufficient to point out the general utility and purpose of the tube. The instant invention, however, is not limited to the particular use to which the tube is put.

In brief, the above objects may be accomplished with a tube constructed in the following fashion. Within an evacuated container there is provided a cathode source of electrons, a control grid, and a target electrode. The cathode is conventional except that, unlike the usual beam deflection type of tube, the electrons impinge simultaneously throughout the area of the grid, as is the case in a conventional triode. The control grid comprises a plurality of wires arranged in the form of one or more meshes or screens. In the simplest case each grid wire is insulated from every other grid wire and a separate lead is brought out of the tube base by means of which appropriate biasing potentials may be applied to the grid wires individually. Where the number of grid wires and leads is too great to make this practical, the grid wires may be interconnected in groups within the tube in a predetermined manner which will be explained in detail below. Each wire, or each group, is thus adapted to be connected to a suitable polarizing potential. Depending on the intended use of the tube, a collector electrode may be included which consists of a plurality of wires adjacent the target to collect electrons emitted by secondary emission from the target. When used for storage, the target may consist of a sheet of mica coextensive with the grid. Since mica is secondary electron emissive, the mica itself constitutes the dielectric surface on which the "memory" potentials are stored. The signal plate is capacitively coupled to all points on the target surface, and may be formed by depositing a metal coating on the rear surface of the mica. Alternatively, the target may be of aluminum having its inner surface suitably treated to form an aluminum oxide coating which constitutes the dielectric secondary-emissive surface. When used to produce a visual indication, Willemite or other fluorescent material may be coated on the target so as to produce a light image indicative of electrons impinging on the target. In this case the mica would be used with a transparent signal plate so that the image can be viewed from the rear. By suitably energizing the grid wires, the flow of electrons can be so controlled that only one aperture is open, or more, as desired. The mica target herein employed is described and claimed in a copending application of R. L. Snyder, Serial No. 516,425, filed December 31, 1942, which is now United States Patent No. 2,464,420 issued March 15, 1949.

The novel features that are considered characteristic of this invention are set forth with particularity in the appended claims. The invention itself, however, both as to its organization and method of operation, as well as additional objects and advantages thereof, will best be understood from the following description of several embodiments thereof, when read in connection with the accompanying drawings, in which Figs. 1 and 2 illustrate the operation of a deflection type of control grid;

Figs. 3 and 4 illustrate the operation of a potential barrier control grid;

Figs. 5 and 5*a* are sectional views of a preferred embodiment of this invention;

II. *Area selection*

The Selectron is distinguished from previously known electronic devices by its ability to select a predetermined area of the target, and to cause electrons to strike only the selected area. The process of area selection has utility in tubes of different types, as discussed briefly above, and therefore the theory of the present grid system will first be explained and several alternate forms will be illustrated.

Figures 1, 2, 3, 4, 7:
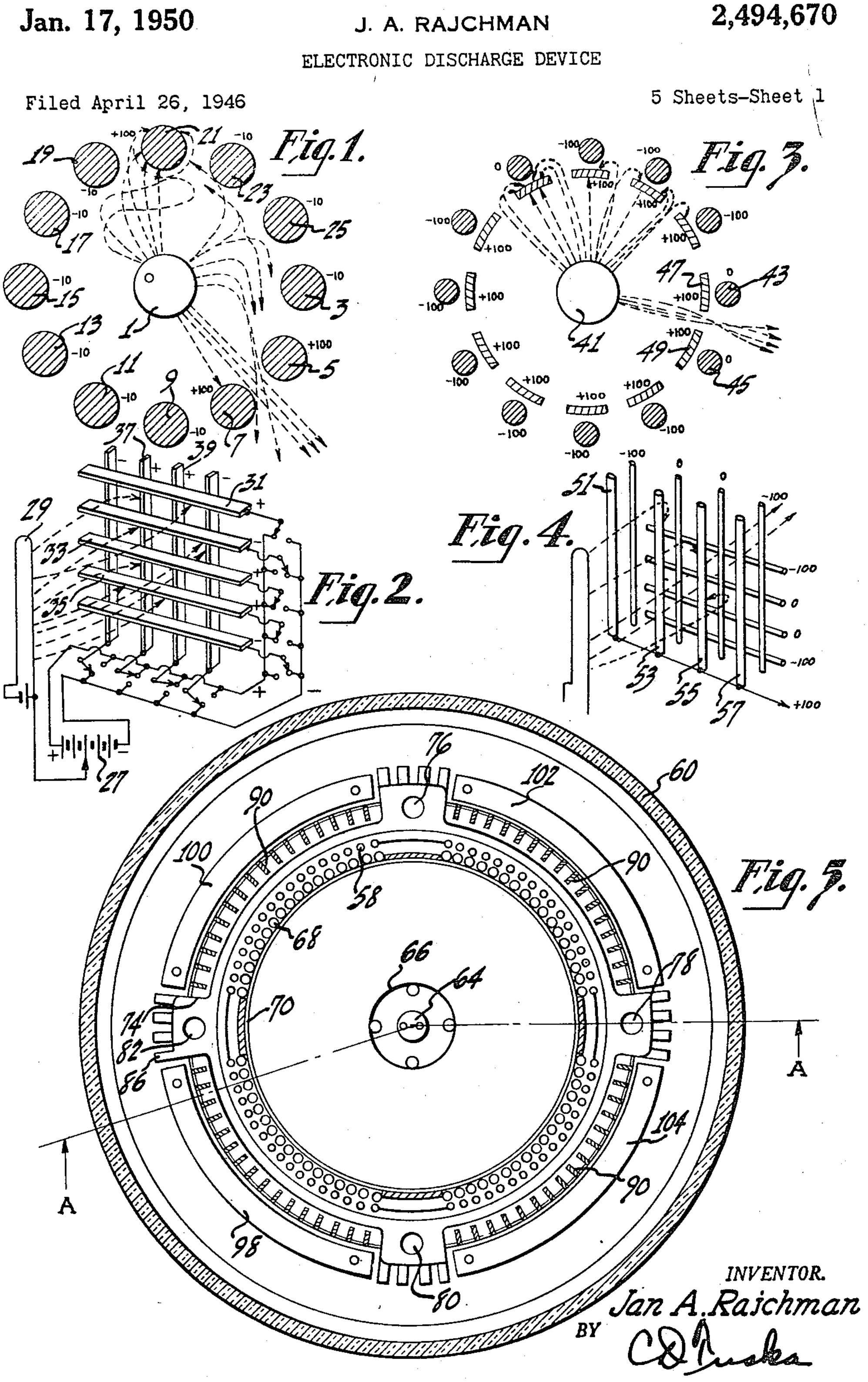
Fig. 7 is a view illustrating the connections to the grid wires of the device shown in Fig. 6.

Referring to the sectional view of Fig. 1, a cylindrical cathode 1 of conventional construction, is centrally positioned within a plurality of concentrically arranged parallel grid wires 3, 5, 7 . . . 25. These wires are intentionally made of large diameter and may be round or rectangular with the widest dimension along the radius. It is obvious that if all grid wires are made negative with respect to the cathode, no electrons will pass between the wires but will be turned back toward the cathode because the potential at all points on a line crossing the gate is negative with respect to the cathode. If one wire, 21 for example, is made positive by 100 volts, say, electrons in the vicinity will be attracted to it, as indicated by the dotted lines converging on the electrode. If the grid wire has substantial depth in a radial direction all electrons directed toward the grid will ultimately land on it, and none will pass between the wires. The aperture between adjacent parallel wires through which electrons may be permitted to pass is hereinafter referred to as a "gate." The actual dimension, of course, depends on the spacing between the grid wires, that is, the width at the gate. It can be shown that if the depth of the gate, measured radially, is at least twice its width, the gate will be closed when one side is positive and the other is at cathode potential, or is negative with respect to cathode.

If two adjacent grid wires 5 and 7 are made positive, for example, then the gate will be open and electrons will pass between the two positive wires, and will strike a target outside the grid. While the simplified drawing illustrates control in one dimension only, it provides a basis for the following generalization: electrons may be made to pass between two adjacent positively biased grid wires, but will not pass between a positive wire and an adjacent negative wire, or between two adjacent negative wires. Thus each pair of wires may be considered as forming a gate through which electrons may or may not be permitted to pass depending upon whether the gate is opened or closed by the application of suitable potentials to the grid wires. Because the electrons which are originally deflected toward a positive grid wire, but which miss it and start to pass through the gate, are then deflected to the positive wire, the arrangement described is called a "deflection" type of control grid.

Applying the above theory to a two-dimensional screen, a grid structure of the deflection type would be as shown in Fig. 2. For convenience only the cathode and a few grid wires are shown. Positive or negative bias is supplied by a battery 27. To illustrate the principle, manually operated switches are shown by means of which each grid wire may be given either a positive or a negative potential with respect to the cathode 29. As illustrated, horizontal wires 31, 33 and 35 are positive, while vertical wires 37 and 39 are also positive. Only one window is opened, where a "window" is defined as the aperture controlled by the intersection of two angularly disposed pairs of adjacent grid wires. In the case illustrated, the open window is defined by the intersection of the four wires 33, 35, 37 and 39. Electrons will therefore pass through this open window, and no other.

The isolated horizontal positive wire 31 does not open a window between the positive vertical wires 37 and 39. It has been demonstrated that a window is opened only when all four wires defining it are suitably energized. It will also be observed that whereas any individual window may be opened, or all may be opened, it will not be possible to open every conceivable combination of windows, although many multiple combinations are possible.

A plurality of parallel grid wires which form one or more gates is hereinafter called a grid "network," while two or more networks cooperatively related to form one or more windows is called a grid "mesh." The term "grid" is used generically to include one or more wires, networks or meshes, or any combination of them.

In the deflection type grid the accelerating field for the electrons leaving the cathode is supplied by the grid itself.

The second basic type of control grid is called the potential barrier type, and a simplified form is illustrated in Fig. 3. In this case the cathode and control grid wires are arranged as before, but the control grid wires can be much smaller, or relatively more widely spaced. Between each control grid wire and the cathode there is provided a round or rectangular accelerating grid wire. All the accelerating grid wires are connected together and constitute an accelerating grid which is maintained at a suitable positive potential, say +100 volts. The control grid wires are individually energized and may either be at a higher negative potential −100 volts, say, or at or near cathode potential. For example, if grid wires 43 and 45 are at cathode potential (0 volts) and the accelerating grid at +100 volts, then the gate between wires 43 and 45 will be open. However, where the control grid wires are at −100 volts, or between such a grid and one at cathode potential, the gates are closed. The dotted lines illustrate the electron paths for the assumed conditions indicated.

A further distinction between the deflection and barrier types should be mentioned. Since the control grids of the former operate at a positive potential they draw considerable current, and thus must be controlled by a low impedance circuit. In the barrier type, however, the accelerating grid draws current, but in general the control grid does not, so that negligible power is required to drive the control grid, and a high impedance driving source may be used.

Referring now to Fig. 4, the operation of a barrier type control grid mesh is illustrated in a perspective view. The accelerating grid wires 51, 53, 55 and 57 are connected together and are physically aligned and in register with the wires of the horizontal or the vertical control grid network, as may be convenient. For the voltage condition indicated, one window is opened, and all others are closed. The same limitation on the selection of a plurality of windows simultaneously applies to the barrier type as stated above relative to the deflection type. The wires of the accelerating grid are preferably somewhat larger than the control grid wires to reduce the electric field in the vicinity of the cathode due to the potentials applied to the control grid.

The method of constructing a grid mesh of the type required depends upon the particular circumstances of each case. For visual reproduction a flat grid and target surface would be preferred, the grid wires being mounted on suitable supports or woven into a fine screen. Each wire would be insulated from every other wire and separate leads brought out, although a system will be described hereinafter for obtaining individual window selection with many less external leads than the number of grid wires connected to them. When used as a storage tube a cylindrical arrangement may be preferred in order to maintain all elements equidistant from the cathode for the sake of greater uniformity of operation.

Figure 5A:
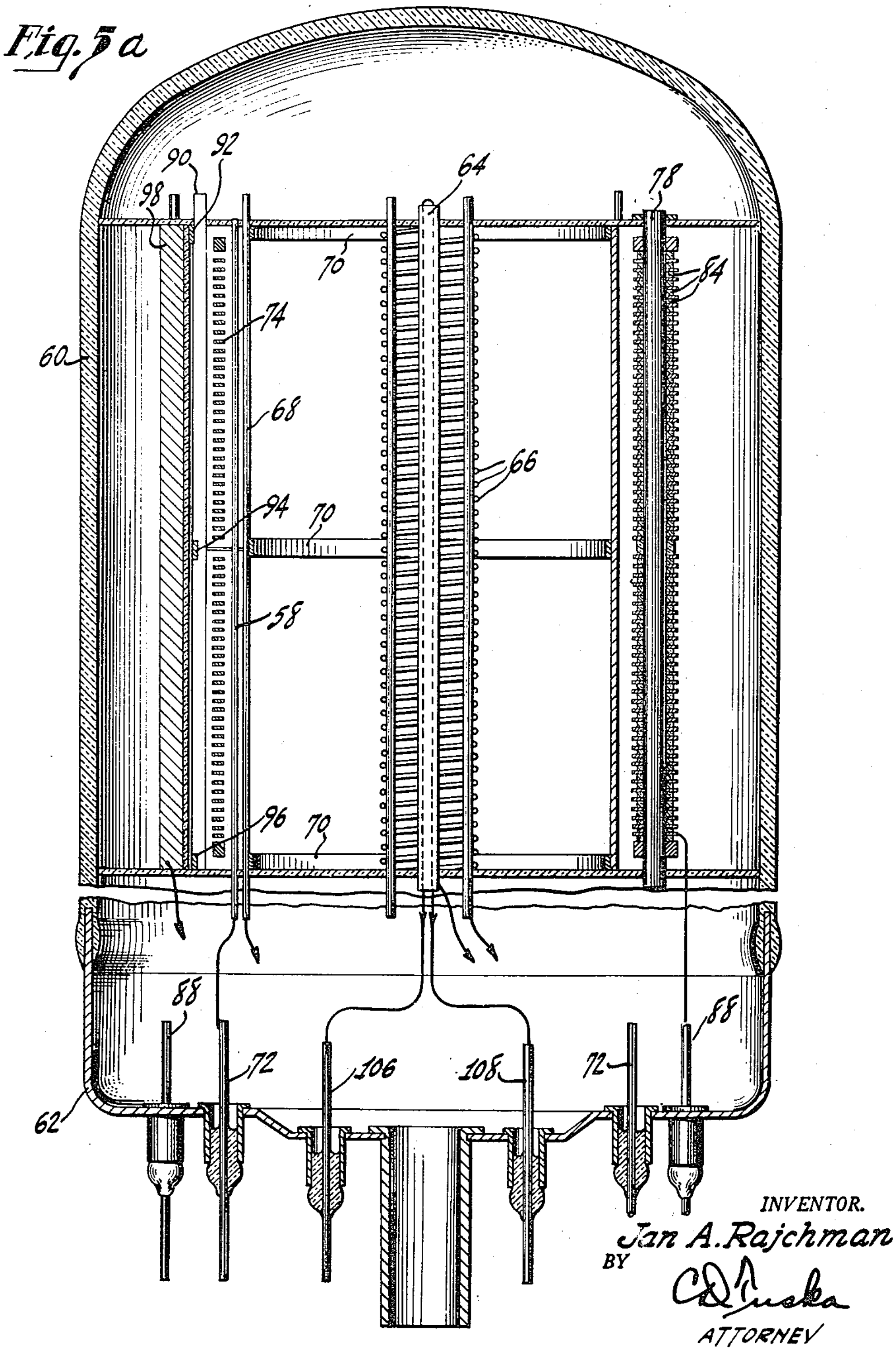

A preferred constructional form of Selectron of this type is illustrated in Figs. 5 and 5*a*, to which reference is now made.

Fig. 5 is a sectional view of a cylindrical potential barrier type Selectron and Fig. 5*a* is a sectional view taken on the line A—A of Fig. 5. An evacuated cylindrical glass enclosure 60 is sealed at its bottom edge to a metal base portion 62 in which are mounted three concentric rings of terminals of conventional construction. A centrally located cathode 64 is surrounded by a helical first accelerating grid 66. The shield or second accelerating grid 68 consists of a network of parallel wires disposed parallel to and equidistant from the cathode. For convenience in mounting these and other elements, they are arranged in four equal sections of seventeen wires each, the space between the groups being utilized for supporting structure. All the wires of accelerating grid 68 are connected together by annular rings 70.

Outwardly from the cathode and in register with the accelerating grid wires there is a like number of wires which constitute the vertical control grid network 58. The individual wires are mounted in mica supports and are connected to the second ring of terminals 72, only two of which are shown, but it is understood that there will be sixty-four of these, one for each grid wire, except that the adjacent wires of the four sections are connected together and to a single terminal. The horizontal wires of grid network 74 take the form of sixty-four annular rings stacked in spaced relation and enclosing the vertical grid wires. The rings may be mounted at four points by four ceramic rods 76, 78, 80 and 82, and spaced by ceramic or other insulating washers 84. Each ring has a tab or extension, such as 86 for connecting the ring to respective terminals 88 of the outer ring. Next to the horizontal grid is the collector grid 90 consisting of a plurality of wires or strips in register with the vertical grid wires, parallel to the cathode, with their wide dimensions along the radii passing through the vertical grid wires. All these wires are connected together by annular conductors 92, 94 and 96. The term "wires" as herein used is intended to include generally all shapes of conductors which comprise a grid network, and is not to be limited to the more narrow construction which infers a round conductor. To aid in the description, the term "conductors" is used when speaking of the elements used within the tube to interconnect the various grid wires, while the term "leads" refers to the wires coming out of the tube for external connection. The signal plate may consist of four aluminum segments of a cylinder, 98, 100, 102 and 104, the inner surface of each being a secondary electron emissive dielectric. The segments are normally connected together, or may be used individually, in which case there will be the equivalent of four tubes in one.

The heater, cathode, first and second accelerating grids, collector and signal plate leads are brought out through the terminals of the inner circle, only two of which, 106 and 108, are shown.

Figure 6:
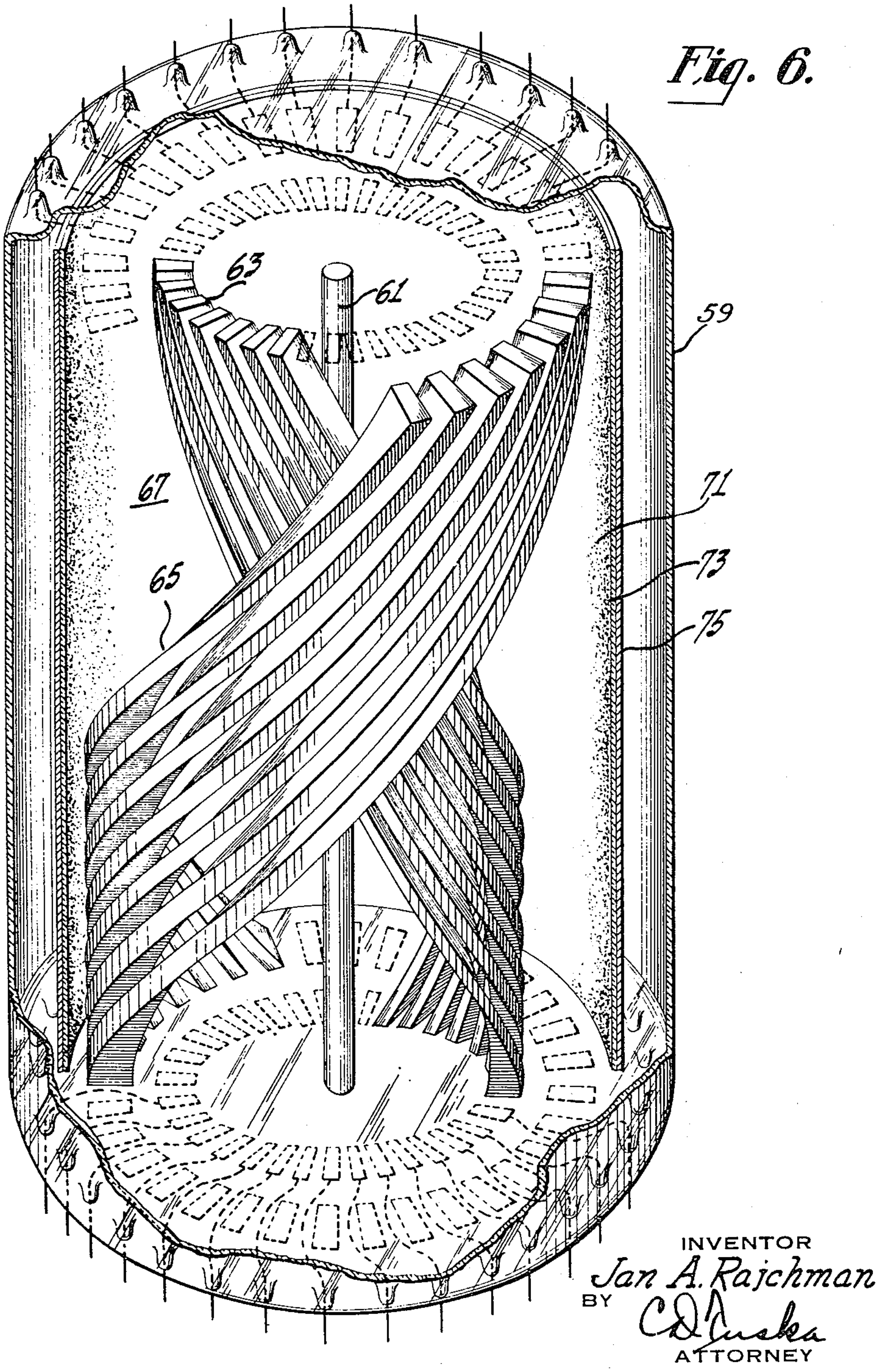
Fig. 6 is a perspective view of an alternative constructional form.
Figure 7:
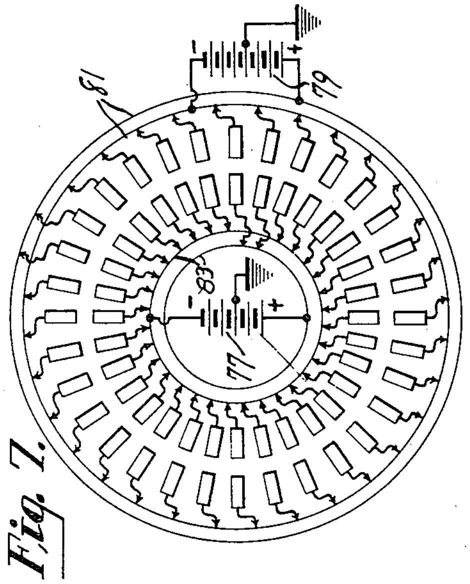

An alternate structural form suitable for the deflection type of grid is shown in Fig. 6. The "horizontal" and "vertical" grid networks which define the electron gates are constructed in the form of concentric helices, one right handed and the other left handed so that the individual wires of one grid network cross the wires of the other grid network at an angle. Thus, within a suitable cylindrical envelope 59, a cathode 61 is concentrically mounted by any conventional means, and leads are brought out through the envelope. The inner grid network 63 consists of a plurality of flat wires with their widths along radii of the tube and wound helically to form a plurality of parallel helices. The pitch is such that the helices make an angle of about 45° with the generatrices of the cylinder. The length is such that each wire completes one half a turn. Individual leads may be brought out through the envelope for applying desired potentials to the wires. All connections to the inner grid are preferably brought out one end of the envelope. A second grid network 65 encloses the first network 63 and is identical thereto, except that it rotates in the opposite direction and is large enough to enclose the inner network without touching it. Individual leads are brought out the other end of the envelope for connection to a positive or negative potential source, as desired.

It will be observed that 32 grid wires are employed in each network and that each wire of one network crosses every wire of the other network. Thus the grids define $32^2$ or 1024 electron windows, any one of which or certain combinations, can be opened as desired.

A cylindrical target electrode 67 encloses the grid mesh. The target may comprise a secondary emissive dielectric such as mica, 73, which supports a metal surface 75. In addition, a fluorescent material may be coated on the inner surface of the mica, in which case the metal surface would be sufficiently thin to be essentially transparent.

Connections to the grid wires may be made as shown in Fig. 7. A manual switch is provided for each grid wire by means of which connection may be made to a positive or negative source of potential. The figure represents schematically the ends of the helical grid wires which are connected to "positive" or "negative" conductors by "pig-tail" connectors. Batteries 77 and 79 represent any conventional source of power. The cathode, not shown, is at ground potential. Conductors 81 and 83 distribute the voltages to the various positions. It is to be understood that in practice switching will be accomplished electronically, but the manual operation serves to illustrate the method of connection.

*III. Combinatorial arrangements*

Where a high order of definition or a large number of memory elements is required, it is apparent that it is impractical to bring lead wires out of the tube connected individually to many thousand grid wires, nor is this necessary. One of the important objects of this invention is to provide a system for interconnecting appropriate grid wires within the tube so that each window may be separately and independently opened by the application of control potentials to a relatively few lead wires which are connected within the tube to more than one grid wire. The possibility of such arrangements may be understood when it is remembered that a gate is opened by a pair of adjacent grid wires, and that a single isolated wire cannot open a gate. Many combinatorial arrangements are possible. The system herein described is called the "Binary system." Other systems are described and claimed in a copending application of G. W. Brown, Serial No. 694,041, filed August 30, 1946.

The binary system requires more than one grid mesh disposed for the successive selection of areas. Because of physical dimensions it is more readily applied to the potential barrier system. The external leads are grouped in pairs and are energized in push-pull so that, in a given pair, one wire is positive and the other relatively negative at all times. The control signal is constituted by the reversal of polarization of one or more of the pairs. It will be appreciated that this system is therefore ideally suited for use with the binary counting system since voltages of this character are directly obtainable from the flip-flops referred to above.

Specifically, instead of one horizontal and one vertical grid network, as shown in Fig. 4, or the equivalent right handed and left handed helical arrangement, a plurality of horizontal and vertical networks are employed which are so aligned that electrons passing through the first network come to the second and third in succession. Any of the successive networks may block the electrons. For example, a tube having 4096 separate windows would include in each dimension three successive grid networks of 64 wires each, each network being so connected that a quarter of its area may be open, the second network selecting a quarter of the open gates of the first, and the third selecting a quarter of the open gates of the second network. Obviously additional grids can accommodate a much larger number of gates.

Figure 8:
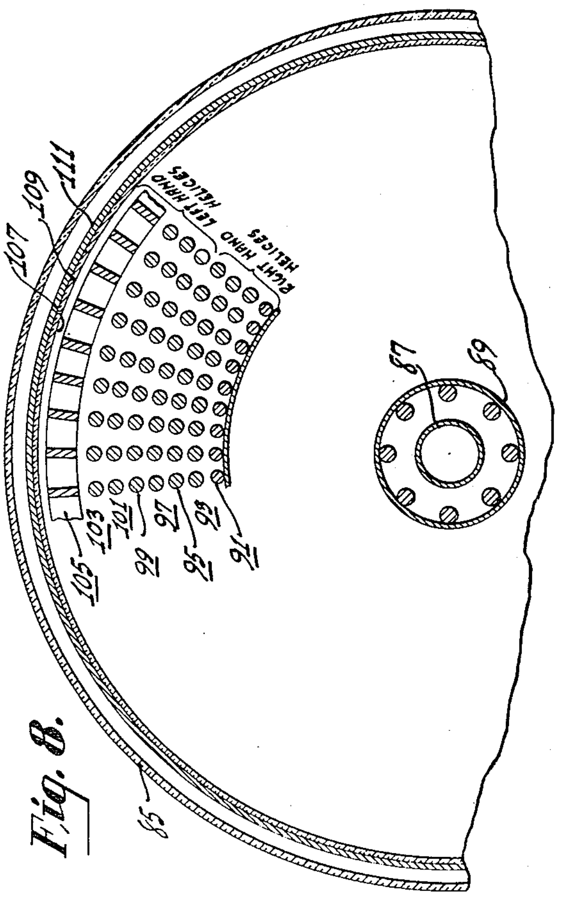
Figs. 8 and 9 are illustrative of a multi-grid tube and a method of connection which greatly reduces the number of control leads.

Referring to Fig. 8, a cross sectional view of a section of a Selectron of the binary control type is shown. Within an evacuated envelope 85 are mounted in the order named, (*a*) a central cylindrical cathode 87, (*b*) a first accelerating grid 89, (*c*) a second accelerating or shield grid 91 forming right handed helices, (*d*) three control grid networks 93, 95 and 97 forming right handed helices, (*e*) three control grid networks 99, 101 and 103 forming left handed helices, (*f*) a ring 105 of collector grid wires, also forming left handed helices, and (*g*) a target comprising a dielectric 109, having a secondary emissive surface 107 and supporting a metal signal plate 111.

All the individual wires of the first accelerating grid 89 are connected together within the tube and to a source of positive potential, as are the individual wires of the second accelerating grid 91. The individual wires of the ring collector 105 are also connected together within the tube. Circuit connections for the control grid will be described subsequently. The wires of the shield grid 91 and the three control grid networks 93, 95 and 97 are all in register, as are the wires of the three outer grid networks and the wires of the collector grid. Thus successive gates are formed by pairs of adjacent wires. The connections to the wires of the left handed control grid networks are shown in detail in Fig. 9. For simplicity of illustration only the left handed networks have been illustrated, but it will be understood that the other group is connected in an identical manner, the two forming the control for 4096 gates as previously discussed.

Figures 9, 10:
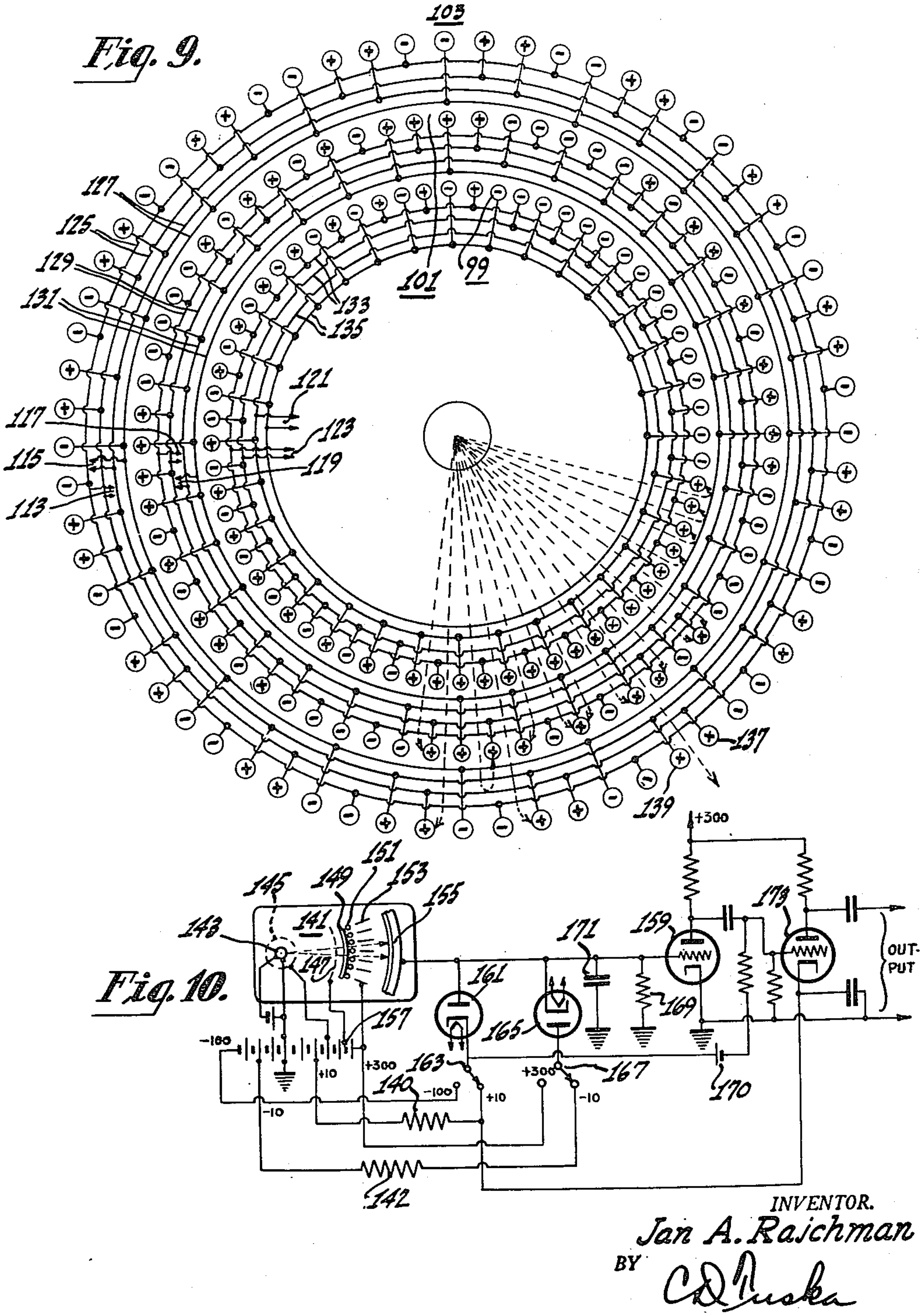
Fig. 10 is a circuit diagram illustrative of the method of operation of a storage tube.

In Fig. 9 the spacing of the grid networks 99, 101 and 103 is not intended to be to scale, this being more accurately represented in Fig. 8. The 64 wires of each of the three grid networks require two pairs of leads for external connection; pairs 113 and 115 for network 103, pairs 117 and 119 for network 101, and pairs 121 and 123 for network 99. These leads are conected within the tube to pairs of conductors 125, 127 . . . 135 which interconnect the grid wires in the manner shown, for example. Thus each conductor is connected to 16 grid wires, each pair to 32. The connections are made so that adjacent wires are never connected to the same pair. Half the wires connected to any pair of conductors are connected to one conductor and the remaining wires are connected to the other conductor, preferably in symmetrical order.

Remembering that in a potential barrier type of grid, the gates are open when adjacent wires are at ground potential and closed adjacent all wires at, say −100 volts, the selection will be illustrated by assuming potentials are applied to the six lead pairs so that the pairs of conductors are energized in accordance with the following table:

*Conductor*

| Pair | Inner | Outer |
|---|---|---|
| 125 | 0 | −100 |
| 127 | −100 | 0 |
| 129 | 0 | −100 |
| 131 | 0 | −100 |
| 133 | −100 | 0 |
| 135 | −100 | 0 |

The dotted lines represent electrons passing between the wires which are open in each successive control grid network. To simplify the illustration a "−" sign has been applied to all grid wires at −100 volts and a "+" sign to all at cathode potential, since these symbols represent the relative potentials of the wires. It will be observed that the electrons pass through all three networks only at one point, i. e., between wires 137 and 139. By other combinations of potential all the other gates may be opened individually. Applying the same principle to the three grid networks of the right hand group 93, 95 and 97, the gates are narrowed to small windows defined by the intersecting pairs. Thus, with 24 lead wires, or 12 pairs, selection of 4096 windows is possible. The 12 pairs can be suitably energized by 12 flip-flops, six for horizontal control and six for vertical control. In a computer application where the individual windows are used to select memory elements, the tremendous reduction in equipment now becomes apparent. Instead of using 4096 flip-flops, one for each memory, as has previously been done, only 12 are now required when used in conjunction with the Selectron.

The utility of the binary system will now be appreciated. Each individual memory element can be identified by two binary numbers, one for the right hand, or "horizontal" grids and one for the left hand or "vertical" grids, which automatically give the proper combination of potentials to open a gate in each network, and thus one window. Thus, if we let the digit zero be represented by the condition in which the inner conductor of any given pair of conductors is positive (the outer conductor will necessarily be negative), and the opposite situation for the digit one, and assuming the six pairs of conductors from the outer circumference reading inward represent the "places" in the binary system, then we can represent the condition illustrated by the number 110010. If the same, or in fact any other, binary number is then applied in similar manner to the other leads a single window will be defined. By establishing the off and on condition of the twelve flip-flops in accordance with this code, each of the 4096 gates may be selected. Alternatively, the two binary numbers may be considered as a single number of twice as many binary places.

Considering only one dimension, the right hand grids, for example, each successive grid network divides the preceding number of open gates by a factor of 4. It follows, then, that the number of gates controlled by a plurality of networks must be a power of 4. In the case illustrated, this is $4^3=64$.

The characteristic of the binary system of connections is, therefore, that where K grid networks are employed in each dimension (that is, right hand and left hand), 4K leads from the tube will be required and binary numbers up to 2K binary positions may be encoded, and there will be $2^{2K}$ gates and $2^{2K}$ wires in each network. Considering both dimensions, the number of networks and leads will be doubled, to 2K and 8K, respectively, but the number of windows and leads will be squared, ($2^{4K}$). The following table represents possible arrangements and clearly indicates the tremendous reduction in leads when the grids are interconnected in accordance with this invention:

| | | | | | |
|---|---|---|---|---|---|
| Number of grid networks in each dimension (K) | 1 | 2 | 3 | 4 | 5 |
| Number of leads per dimension (4K) | 4 | 8 | 12 | 16 | 20 |
| Total number of control grid networds (2K) | 2 | 4 | 6 | 8 | 10 |
| Total number of leads (8K) | 8 | 16 | 24 | 32 | 40 |
| Total number of windows ($2^{4K}$) | 16 | 256 | 4,096 | 65,536 | 1,048,576 |

It may be seen that over a million windows and thus the same number of memory elements, can be controlled by a Selectron having 5 horizontal and 5 vertical control grid networks and only 40 external leads which can be controlled by 20 flip-flops.

IV. *Storage*

The "memory" of the selectron lies in its ability to utilize electrons passing through any window to establish in each elemental area of the target opposite each window a condition indicative of the information to be stored, and subsequently to give up the information contained in the memory. Because of the obvious relation to the two digit binary system, the storage need only be of the "yes" or "no" type. Thus, after selecting a given window the bombarded area is made to assume either one of two predetermined potentials or charges. Later, on reopening the same window, the condition previously established is detected.

In the copending application of R. L. Snyder, Serial No. 606,812, referred to above, it has been shown that when an area of a secondary-electron emissive dielectric surface is bombarded by electrons having sufficient energy to release more secondary electrons than there are bombarding electrons (that is, when the secondary emission ratio is greater than one), and when there is a secondary electron collector adjacent the area, the surface of the dielectric will assume the potential of the collector. Therefore, by modulating the potential of the collector the bombarded point can be brought to any desired potential, or to one of two preselected potentials corresponding to the conditions "yes" and "no."

If the electrons are then cut off, the little condenser formed by the bombarded side of the dielectric, as one plate, and the adjacent metal signal plate, as the other, will remain charged for a considerable period, depending on the leakage resistance of the dielectric surface. When the electron bombardment is reestablished, if the potential of the collector has changed, the bombarded dielectric area will immediately readjust itself to the new condition, and due to the inherent capacity of the area, a displacement current will flow in the signal plate indicative of this change. If, however, the potential of the collector is the same as it was previously there will be no change, and consequently no signal current. The stored information can thus be derived from the memory. With the previously known system of Snyder, however, the stored information is destroyed by the reading process. Also there are practical limits as to the length of time the charge may be held without becoming dissipated. The Selectron may be used in this manner, but it may also be used in a new and improved manner which permits indefinite storage and does not destroy the stored information when it is "read." Storage of this type, called "active" storage, is not possible with storage tubes of the scanning type.

It was shown above that the dielectric surface takes the potential of the collector when the secondary emission ratio is greater than one. If, however, the secondary emission ratio is less than one, then the surface goes immediately to cathode potential. There are, therefore, two stable potentials which the surface may assume. When the secondary emission ratio is less than one, as it is when the bombarded surface is at cathode potential, the condition is stable because if, for any reason, the surface potential tried to go above cathode potential the surface would immediately attract a large number of negative electrons which would drive its potential down. It cannot go below cathode potential as a result of electron bombardment since electrons would have to overcome a potential barrier. When the secondary emission ratio is greater than one, the surface charges to a stable potential nearly that of the collector, because if the surface potential tends to go higher than the collector potential, the secondary emission will be suppressed since there will be no collecting field. Thus the number of negative electrons remaining on the dielectric increases, pulling the potential down again. If the dielectric surface tries to go below collector potential, secondary emission is not suppressed, thus raising the potential again.

Therefore, if all the windows are opened to produce uniform bombardment, a condition possible only with the Selectron, when some memory elements are at cathode potential and some at collector potential, these potentials will remain indefinitely, at least as long as the power is left on and the bombardment continues, or until definite steps are taken to change the potentials of one or more elements.

In general the following method is employed to store information representative of a given condition. Since all elemental areas of the dielectric surface are capacitively coupled to another electrode such as the signal plate, the potential of any particular area will follow changes in the potential of the signal plate. If, however, an elemental area is bombarded by electrons, the electron stream will compensate for any change in its potential and hold it at its original value. Consequently, the change from one stable condition to the other is made either in the absence of impinging electrons, or by "brute force," the latter term implying the condition where the potential change is great and so rapid that the electron stream cannot compensate for the change. To set a selected area to indicate "yes" or "no" the electron stream is shut off from the dielectric area which has been selected and the area is subjected to potentials above or below that necessary to produce a secondary emission ratio greater than one. The gate is then opened and electron bombardment initiated. Alternatively, the area may be subjected to successive potentials above and below the critical value, and the potential frozen at the desired value by initiating electron bombardment at the correct instant. Thus, "yes" would be represented by the dielectric stabilized at collector potential and "no" would be represented by the element stabilized at cathode potential. The successive potentials mentioned may be produced by modulating the signal plate which is capacitively coupled to the dielectric area. This modulation may be accomplished by an alternating current voltage of any desired waveshape.

There are many circuits for initially establishing the individual dielectric area at collector or cathode potential in accordance with the method outlined above. A signal plate modulation method is illustrated in Fig. 10 which shows schematically the necessary circuit connections. A potential barrier Selectron 141 is indicated by a partial representation of a cathode 143 accelerating grids 145 and 147, a horizontal control grid network 149, vertical control grid network 151, collector 153 and signal plate 155, its inner surface including a secondary emissive dielectric material. Battery 157 provides the necessary direct current potentials. The selection system for the horizontal and vertical control grid wires is not shown, it being assumed that suitable switching means is provided to select the windows or memories as required. The output of the signal plate is applied to the grid of an amplifier tube 159 which is used to indicate or utilizes the "yes" or "no" information when the data is desired. The plate of a diode 161 is connected to the signal plate 155, the cathode being connected to a switch 163 normally positioned to apply a potential of +10 volts to the cathode, through a resistor 140, but capable of applying a negative potential, −100 volts for example, to the cathode. The diode is therefore normally biased off and presents no load across the output. When desired a negative pulse may be applied to the signal plate by operating switch 163 to the left. A second diode 165 is connected in the opposite sense to the signal plate. Through a switch 167 this diode is also normally biased off, but may be used to apply a large positive pulse to the signal plate. A resistor 142 may be included in the bias circuit.

Figure 11:
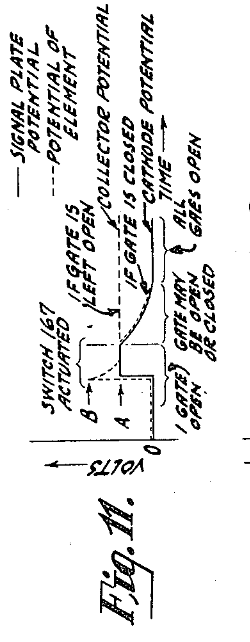
Figs. 11 and 12 are curves useful in understanding the method of operation illustrated in Fig. 10.

Referring to Figs. 10 and 11, information is put into the Selectron in the following manner:

(*a*) Close all windows except the one which is to store the information. One window will be open.

(*b*) Momentarily actuate switch 167 to suddenly raise the potential of the signal plate by an amount at least equal to the cathode-collector potential difference. If the element was previously at cathode potential it will now be at collector potential or above. (Point A, Fig. 11.) If it had previously been at collector potential it will go momentarily to twice that value, or more, (point B) but the secondary emission will, in from 1 to 10 microseconds, bring it back to collector potential. Whatever its previous potential, therefore, the element is "cleared" and brought to collector potential. Switch 167 is now in its original position and the signal plate potential begins to leak off through tube 161 and resistor 169. There are now two choices which determine the ultimate status of the element. Either (*c*) Leave the window open, in which case the element will stay at collector potential because the electrons provide a sufficient current to charge the capacitor and maintain it at collector potential as previously discussed, or (*d*) Close the window, in which case there are no electrons to hold the element at collector potential, and it follows the signal plate down to cathode potential.

The rate of discharge of the signal plate must be sufficiently slow for the electron stream to supply the necessary charging current. The discharge rate may be adjusted as desired by selecting suitable values for resistances 140 and 169 and capacitance 171.

Briefly stated, the above process is simply this: Open the window in question. Momentarily actuate switch 167 and then immediately close the window if the memory is to hold a "no" or do not close the window if the memory is to hold a "yes." When this is done, all windows may be opened and the information will be "frozen" as long as desired. Merely opening and closing the windows will not change the status of any of the elements. Furthermore the process may be completed as often as desired to "set" other elements, and those previously set will not be changed because the electrons would, of course, be shut off throughout the entire process from all elements except the one being used. Any number of elements can therefore be selected in succession by coding the control grids, for example by a tape director mechanism which also controls the pulsing switch, and the Selectron may be filled at a very rapid rate. Mechanical switches would, of course, be replaced by electronic switches for greater speed.

The process of deriving the stored information will now be explained in connection with Figs. 10 and 12. The following steps are taken:

(*a*) Close all windows except that of the element to be read.

(*b*) Actuate switch 163 momentarily to apply a brief negative potential ΔV to the signal plate. The amplitude of this potential ΔV is such that collector potential V minus the potential ΔV is still above the point required to maintain a secondary emission ratio greater than one. If the element was previously at cathode potential (see line A, Fig. 12) it simply goes more negative and no more electrons can get to it, and then follows the signal plate potential back to its original condition when the negative pulse is removed. In the other case, however, the element acts as shown in the dotted line B of Fig. 12. That is, since the secondary emission ratio is still greater than one the element potential immediately starts back to collector potential V. When the signal plate is brought back to its original potential at the end of the pulse, the element goes positive by a like amount and becomes V+ΔV, and, because this is an unstable condition, it immediately begins to return to collector potential. This causes a displacement current C to flow in the signal plate which constitutes the output signal.

(*c*) Open all windows to maintain all elements in their original state. Note that the element "read" ends up in exactly the same condition it had previously, so the reading process does not destroy or change the information contained in an element.

Figure 12:
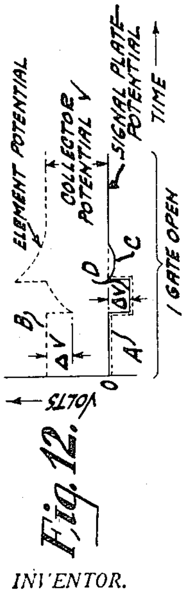

It will be noted from Fig. 12 that the signal pulse C is negative in polarity. It is desirable to prevent the negative "take off" pulse D which immediately precedes it from entering the signal circuit. This is accomplished by applying the undesired negative pulse, produced by the momentary actuation of switch 163, to the grid of the second output amplifier tube 173. The negative take off pulse is therefore prevented from affecting the signal output. The signal pulse C, however, occurs after switch 163 has been returned to its normal position, and is therefore readily passed by the amplifier since this tube is normally biased at or just below cut-off, for example, by a bias battery 170. The "putting on"

pulse, shown in Fig. 11, is of such polarity that the resultant pulse applied to the grid of the tube 173 is negative, and therefore this pulse does not affect the signal output.

The method of putting information in and taking it out described above changes the relative cathode-signal plate potential, and it follows that similar results can be obtained by "cathode modulation." In the latter system the cathode potential is raised or lowered and has the advantage that the signal plate output circuit is undisturbed. It has the disadvantage, however, that changing the cathode potential relative to the control grid potentials may cause the gates to open unless much larger negative grid voltages are used, and this will require additional precautions to prevent a break-down of the insulation between adjacent grid wires.

Figure 13:
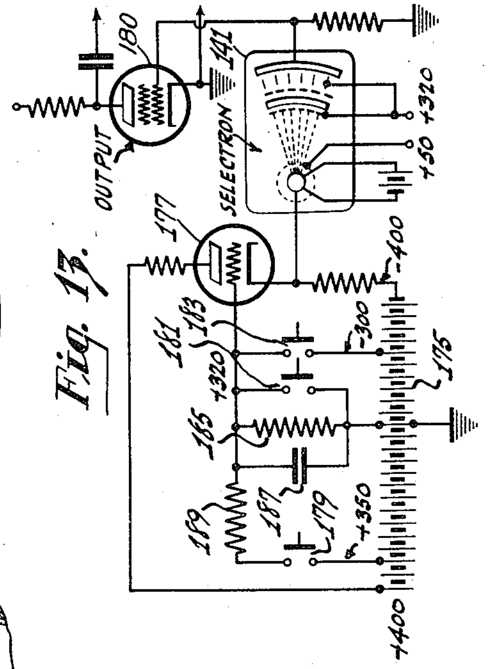
Fig. 13 is a circuit diagram of an alternative method of operation.

A somewhat different circuit for accomplishing cathode modulation for setting and reading storage elements is shown in Fig. 13. A battery 175, or other similar source of power provides the necessary voltages which may be applied to the grid of a cathode follower tube 177 by switches 179, 181 or 183. Switch 183 connects the grid to −300 volts, switch 181 connects the grid to ground and switch 179 connects a high positive potential to a parallel resistor 185—capacitor 187 combination through a resistor 189. This time delay circuit is such that the potential applied to the grid of tube 177 builds up relatively slowly after switch 179 is closed and dies away in the same manner after it is opened. The circuit is arranged so that the ultimate direct current potential is +320 volts when capacitor 187 is fully charged. The cathode of tube 177 is connected to the Selectron cathode. Output is derived from the signal plate through an amplifier tube 180. All the switches are normally open, and are conveniently of the "push button" type. However, it must be remembered that the manually operated circuits herein described are only for the purpose of setting forth the operation of the Selectron. In practice, electronic switches would normally be employed to provide faster action. Such applications, however, are not a part of this invention.

To set a given element whose previous condition is not known, close all windows except the one in question and pulse the cathode abruptly to −300 volts by depressing switch 183. If the element was previously at collector potential it will stay there since secondary emission ratio is increased by the relatively lower cathode voltage. If the element was previously at normal cathode potential, the new potential difference is such that the secondary emission ratio suddenly increases beyond unity and the element quickly rises to collector potential (+320 volts).

Switch 179 is then depressed, raising the cathode relatively slowly to +310 volts, at which point the bombarding potential from cathode to collector is only 10 volts (320—310), so that the secondary emission is less than one and the element, if it had been at collector now assumes the existing cathode potential, then equal to +300 volts. The final condition is determined in one of two ways: (1) operate switch 181 to return the cathode to normal (ground) potential abruptly, leaving the element at collector potential, or, (2) permit the cathode to return to ground potential relatively slowly as the charge in capacitor 187 leaks off, carrying the element down to cathode potential with it. All windows may then be opened.

To read the information without destroying it, it is only necessary to pulse the cathode to about +310 volts, with all windows closed except the one being read. If the element was at cathode potential to indicate "no," no output signal will be obtained, since the element is then negative with respect to the cathode and repels electrons. If, however, the element had been at collector potential, it will still be 10 volts above cathode and will be bombarded with slow electrons, tending to make it go negative, and thus producing a displacement current in the signal plate. The cathode is then returned to ground potential sufficiently fast that the element cannot follow it.

What I claim is:

1. An electron discharge device comprising a cathode, a control grid and a target relatively positioned in the order named; said control grid comprising two parallel grid networks, each network having a plurality of wires and each wire being electrically insulated from every other wire, the wires of one network being at an angle with respect to the wires of another network, and conductors individually connected to said wires for applying control voltages thereto.

2. An electron discharge device comprising a cathode, a control grid and a target relatively positioned in the order named; said control grid comprising at least two parallel grid networks, each network having a plurality of wires and each wire being electrically insulated from every other wire, conductors interconnecting predetermined wires of each network into selected groups of wires in which no two adjacent wires are connected to the same conductor; and leads external to said device and connected to said conductors for applying control voltages to said groups of wires.

3. An electron discharge device comprising a source of electrons, a target electrode, and control means positioned between said source and said target, said control means comprising a first grid network of parallel wires, each wire being electrically insulated from every other wire, and a second grid network of parallel wires, each wire being electrically insulated from every other wire, the wires of said first network being angularly disposed with respect to the wires of said second network to form a plurality of electron windows defined by a pair of adjacent wires in each of said networks; and conductors individually connected to said wires for applying a given biasing potential to at least one selected pair of adjacent wires in each of said networks and a different biasing potential to at least one wire of the remaining pairs of adjacent wires, whereby said windows may be opened or closed to the passage of electrons in accordance with the biasing potentials applied to said pairs of wires.

4. An electron discharge device comprising a source of electrons, a target, and a grid located between said source and said target, said grid comprising a plurality of electrically insulated wires relatively angularly disposed with respect to each other which define windows between pairs of adjacent wires, and conductors for applying biasing potentials to said wires to open a selected one and close said windows to the remaining of said electrons, whereby said electrons impinge on selected areas of said target.

5. An electron discharge device comprising a source of electrons, a target and a grid located between said source and said target, said grid comprising a plurality of electrically insulated wires relatively angularly disposed with respect to each other which define windows between pairs of adjacent wires, conductors interconnecting selected ones of said wires within said device no two adjacent wires being connected to the same conductor, and leads connected to said conductors for applying potentials to said wires to open and close said windows to said electrons, whereby said electrons impinge on selected areas of said target in accordance with the potentials applied to said wires.

6. A device of the character described in claim 5 in which said target includes a dielectric secondary emissive surface and a signal plate in capacitive relation to all points on said surface.

7. An electron discharge device comprising a source of electrons, a target and a grid located between said source and said target, said grid comprising at least two networks of electrically insulated wires, the wires of at least one network being at an angle with respect to the wires of another network, said grid and said target being substantially coextensive in area, and circuit means electrically connected to said grid for biasing selected wires of said grid for limiting electron bombardment of said target only to a preselected area of said target in register with the intersection of two pairs of adjacent angularly related wires.

8. A device of the character described in claim 7 which includes, in addition, a collector electrode positioned between said grid and target and further characterized in that said target includes a secondary electron emissive surface.

9. An electron discharge device comprising a source of electrons, a target and a grid located between said source and said target, said grid comprising a first network of electrically insulated parallel wires and a second network of electrically insulated parallel wires positioned at an angle the wires of said first network to form a mesh which defines a plurality of windows through which electrons may pass, means between said electron source and said grid for directing said electrons to impinge substantially uniformly over the surface of said grid, conductors interconnecting selected ones of said wires no two adjacent wires being connected to the same conductor, and a plurality of leads for external connection to said conductors, the number of leads being less than the number of wires, and means including said leads for applying biasing voltages to selected ones of said wires.

10. An electron discharge device comprising a source of electrons, a target and a grid located between said source and said target, said grid comprising two groups of K grid networks each network having $2^{2K}$ parallel wires, the wires of one group being at an angle with respect to the wires of the other group, said networks being positioned to control successively the electrons passing from said cathode to said target, 4K conductors interconnecting the individual wires of each of said groups of networks; and 4K pairs of leads providing external connection to said conductors, where K is any integer.

11. An electron discharge device comprising a source of electrons, a target and a grid, said grid comprising 2K grid networks each having $2^{2K}$ parallel wires, said networks being arranged to control successively the electrons passing from said cathode to said target, the wires of half of said networks being at an angle to the wires of the other networks conductors interconnecting the individual wires of said networks into 8K groups, and 8K leads connected to said groups for applying control potentials to said wires, where K is equal to any integer.

12. A device of the character described in claim 11 in which said target includes a dielectric having a secondary emissive surface and a signal plate in capacitive relation to all points on said surface, and which includes, in addition, a collector electrode comprising a plurality of wires between said target and said grid and in register with the adjacent wires of said grid electrode.

13. A device of the character described in claim 11 in which the wires of said half of said networks are in register, and the wires of the other networks are also in register.

14. A device of the character described in claim 10 in which the wires of one of said groups of networks are arranged in concentric circles about and parallel to said cathode.

15. A device of the character described in claim 11 in which the wires of said networks lie on the surfaces of cylinders concentric with said cathode and form equal numbers of right hand and left hand helices.

16. An electron discharge device including a cathode, a control grid and a target relatively located in the order named, said control grid including a first grid network comprising a plurality of wires lying on the surface of a cylinder concentric with said cathode and forming helices rotating in one direction, and a second grid network concentric therewith and comprising a plurality of wires forming helices rotating in the opposite direction.

17. An electron discharge device comprising a cathode, a control grid and a target relatively located in the order named, said control grid including a first grid network consisting of a plurality of flat wires lying on the surface of a cylinder concentric with said cathode and forming helices rotating in one direction and a second grid network concentric therewith and comprising a plurality of flat wires forming helices rotating in the opposite direction, the wires being so oriented that the wide dimension is substantially parallel to radii passing through said wires.

18. A device of the character described in claim 17 in which said wires rotate approximately one-half turn from one end of the grid network to the other.

19. An electron discharge device comprising an elongated cathode, an accelerating grid, a control grid, a collector and a target relatively located in the order named, said control grid comprising a first network of individually insulated wires parallel to and lying in a circle concentric with said cathode and a second network of individually insulated wires forming circles concentric with said cathode and lying in planes perpendicular thereto.

20. An electron storage tube comprising a source of electrons, a target including a dielectric having a secondary emissive surface presented to said source; a control grid interposed between said source and said target, means including bias potential supply leads connected with said control grid for causing said electrons to strike a selected elemental area of said surface, a signal electrode adjacent said surface and in capacitive relation to all points thereon, and means connected to said source of electrons and said signal electrode and extending from said tube for connection to an external circuit for causing the selected elemental area of said surface to assume a potential indicative of a condition to be stored.

21. An electron storage tube comprising a source of electrons, a target including a dielectric and having a secondary emissive surface presented to said source; a control grid comprising a plurality of angularly disposed electrically insulated wires interposed between said source and said target; means interconnecting said grid wires and having leads external to said tube for applying one or the other of two biasing potentials to selected wires of said control grid for causing said electrons to strike a selected elemental area of said surface, means for causing said selected area to assume a potential indicative of a condition to be stored, and means for deriving from said tube a signal indicative of said potential previously established.

22. An electron storage tube comprising a cathode source of electrons, a target including a dielectric having a secondary emissive surface presented to said source, a control grid comprising a plurality of relatively angularly disposed electrically insulated wires interposed between said source and said target, a collector electrode adjacent said target, means interconnecting said grid wires and having leads external to said tube for applying a given biasing potential to a first pair of adjacent wires and to a second pair of adjacent wires angularly related thereto for causing said electrons to pass through windows defined by pairs of adjacent wires of said grid and strike a selected elemental area of said surface; means connected to said cathode and said target and extending from said tube for connection to an external circuit for causing said selected area to assume a potential indicative of a condition, said potential being stable during continuous electron bombardment of said area, and means coupled to said target for deriving from said tube a signal indicative of said potential previously established.

23. An electron discharge device comprising, within an evacuated envelope, a cathode, a control grid and a target electrode relatively positioned in the order named; said control grid comprising two parallel grid networks, each network having a plurality of wires each electrically insulated from the other, the wires of one network being at an angle with respect to the wires of the other network, and a plurality of conductors connected, respectively, one to each of said wires and extending through said envelope for making external connection to said wires.

24. An electron discharge device comprising, within an evacuated envelope, a cathode, an accelerating grid, a control grid, a collector and a target relatively positioned in the order named; said accelerating grid comprising a plurality of wires parallel to said cathode and positioned in spaced relation equidistantly from said cathode, all of said wires being connected to a single lead passing through said envelope; said control grid comprising a first grid network consisting of a plurality of electrically insulated wires in register with the wires of said accelerating grid, respectively, and a second grid network consisting of a like number of electrically insulated ring-shaped wires concentric with said cathode and lying in spaced planes perpendicular thereto; and said collector comprising a plurality of wires parallel to said cathode and spaced equidistantly therefrom in register with the wires of said accelerating grid.

JAN A. RAJCHMAN.

REFERENCES CITED

The following references are of record in the file of this patent:

UNITED STATES PATENTS

| Number | Name | Date |
|---|---|---|
| 1,779,748 | Nicolson | Oct. 28, 1930 |
| 2,035,003 | Thompson | Mar. 24, 1936 |
| 2,122,102 | Lundell | June 28, 1938 |
| 2,172,859 | Toulon | Sept. 12, 1939 |
| 2,182,152 | Hullegard | Dec. 5, 1939 |
| 2,293,368 | Stuart | Aug. 18, 1942 |
| 2,301,748 | Renshaw | Nov. 10, 1942 |
| 2,399,429 | Edwards | Apr. 30, 1946 |
| 2,424,289 | Snyder, et al. | July 22, 1947 |

Certificate of Correction

Patent No. 2,494,670 January 17, 1950

JAN A. RAJCHMAN

It is hereby certified that error appears in the printed specification of the above numbered patent requiring correction as follows:

Column 16, line 69, for the words "and close said windows to the remaining of said" read *and close the remaining of said windows to said*;

and that the said Letters Patent should be read as corrected above, so that the same may conform to the record of the case in the Patent Office.

Signed and sealed this 20th day of March, A. D. 1951.

[SEAL]

THOMAS F. MURPHY,
*Assistant Commissioner of Patents.*